United States Patent [19]
Epworth

[11] Patent Number: 5,602,949
[45] Date of Patent: Feb. 11, 1997

[54] CHIRPED DISTRIBUTED BRAGG GRATING OPTICAL FIBRE FILTERS

[75] Inventor: Richard E. Epworth, Herts, United Kingdom

[73] Assignee: Northern Telecom Limited, Montreal, Canada

[21] Appl. No.: 599,120

[22] Filed: Feb. 9, 1996

Related U.S. Application Data

[63] Continuation of Ser. No. 372,031, Jan. 12, 1995, abandoned.

[30] Foreign Application Priority Data

Feb. 26, 1994 [GB] United Kingdom ............... 9403739

[51] Int. Cl.[6] ........................................... G02B 6/34
[52] U.S. Cl. .................. 385/37; 359/570; 385/13; 385/27
[58] Field of Search ................ 385/1, 4, 10, 12, 385/13, 27–29, 37, 39, 123; 359/34, 558, 566, 569, 570; 250/227.14, 227.16, 227.18, 227.19, 227.23, 227.24

[56] References Cited

U.S. PATENT DOCUMENTS

| | | | |
|---|---|---|---|
| 4,807,950 | 2/1989 | Glenn et al. | 350/3.61 |
| 5,007,705 | 4/1991 | Morey et al. | 385/12 |
| 5,257,273 | 10/1993 | Farries et al. | 385/27 X |
| 5,388,173 | 2/1995 | Glenn | 385/37 |
| 5,420,948 | 5/1995 | Byron | 385/37 |

FOREIGN PATENT DOCUMENTS 2161612  1/1986  United Kingdom.

*Primary Examiner*—John D. Lee
*Attorney, Agent, or Firm*—Lee, Mann, Smith, McWilliams, Sweeney & Ohlson

[57] ABSTRACT

A distributed Bragg grating of uniform pitch is created in a length of unstrained optical fibre which is then secured in an arcuate path to a flexible plate so as to be displaced from the neutral surface of bending of that plate. Changing the curvature of the plate imparts axial strain in the fibre which is arranged to be non-uniform as the result of the path of the fibre being arcuate. This non-uniform strain has the effect of converting the uniform grating into a chirped grating, such as may for instance be used as a dispersion equaliser.

2 Claims, 2 Drawing Sheets

CHIRPED DISTRIBUTED BRAGG GRATING OPTICAL FIBRE FILTERS

This application is a continuation of U.S. application Ser. No. 08/372,031, filed Jan. 12, 1995, now abandoned.

BACKGROUND TO THE INVENTION

This invention relates to the production of chirped Bragg grating optical fibre filters. A particular, though not necessarily exclusive, application for such filters is to be found in the provision of optical fibre dispersion equaliser, as for instance described in U.S. Past. No. 4,953,939, to which attention is directed. U.S. Pat. No. 4,953,939 describes a way of making a uniform pitch distributed Bragg grating in an optical fibre by launching into it a high power beam of light and by using a reflector to produce a standing wave pattern in the fibre. An alternative way of making such a uniform pitch grating is to illuminate the fibre from the side with an interference pattern of alternate high and low intensity bands of light. In both instances the resulting grating will normally be of uniform pitch because standing waves and interference patterns are normally of uniform pitch. On the other hand, for many applications, such as in dispersion equalisation, a chirped pitch is required. U.S. Pat. No. 4,953,939 describes a number of different ways in which such chirping can be attained. The present invention is directed to a novel way of providing chirping. U.S. Pat. No. 4,807,950 also relates to the making of uniform pitch distributed Bragg gratings in optical fibres. It does not make any reference to chirping such gratings, but it does refer to attaching to a flexible plate a fibre having a set of different Bragg gratings at different positions along its length. Subsequent bending of the plate subjects each of these gratings to a uniform strain so as to change the pitch of each, and hence its Bragg reflection wavelength. The value of the strain may be different for different members of the set by virtue of bending the plate to a different radius of curvature in each region registering with a different member of the set of gratings.

SUMMARY OF THE INVENTION

According to the present invention there is provided a chirped distributed Bragg grating optical fibre filter having an optical fibre provided with a Bragg distributed grating therein, which grating has a uniform pitch when the fibre is unstrained, and which fibre is secured in an arcuate path to a flexible plate so as to be displaced from the neutral surface of bending of that plate, which path is arcuate when the plate is planar.

The invention also provides a method of making a chirped distributed Bragg grating optical fibre filter wherein a uniform pitch distributed Bragg grating is generated in a length of optical fibre that at the time of generation is unstrained or uniformly strained in its axial direction, wherein the fibre is then secured to a flexible plate in an arcuate path that is displaced from the neutral surface of bending of the plate, and wherein the curvature of the plate is subsequently changed so as to import axial strain to the fibre that is non-uniform along the length of the grating generated therein.

A feature of this way of providing a chirped grating is that the chirp function can readily be changed from fibre to fibre merely by changing the contours of the arcuate paths on or in their associated flexible plates. Another feature is that the chirping of any individual fibre is adjustable within certain limits by adjusting the curvature of its flexible plate.

BRIEF DESCRIPTION OF THE DRAWINGS

There follows a description of a distributed Bragg chirped grating optical fibre filter embodying the present invention in a preferred form. The description refers to the accompanying drawings in which.

DETAILED DESCRIPTION OF PREFERRED EMBODIMENTS

Figure 1:
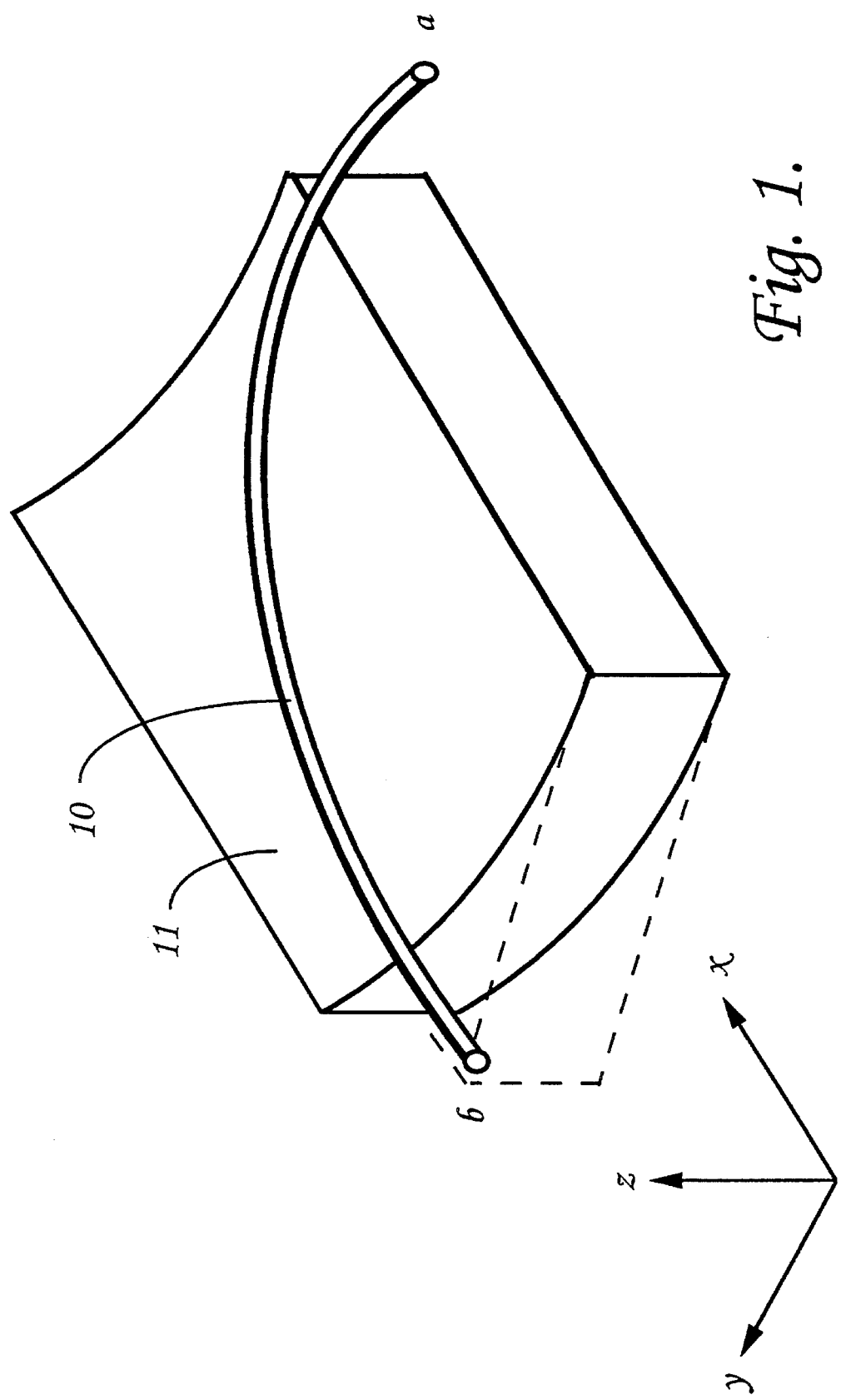
FIG. 1 depicts a perspective view of the filter.
Figure 2:
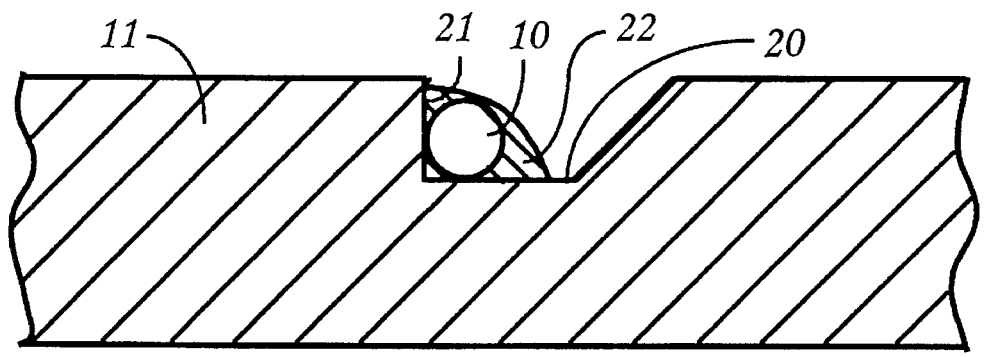
FIGS. 2, 3 and 4 are schematic scrap sectional views depicting some alternative methods by which the optical fibre of the filter may be secured to its flexible plate.

Referring to FIG. 1, a single mode optical fibre 10, in which a uniform pitch distributed Bragg grating has been formed, is secured in an arcuate path to a flexible plate 11. Conveniently the arcuate path is defined by a groove formed in the surface of the plate. This groove may have the form as depicted in FIG. 2 in which a right-angled corner is formed between the floor 20 of the groove and a vertical side-wall 21 located on the outside of the curve. The natural springiness of the fibre will tend to urge it against the vertical side wall 21, and it may conveniently be secured in the corner by means of a fillet of adhesive 22.

Figure 3:
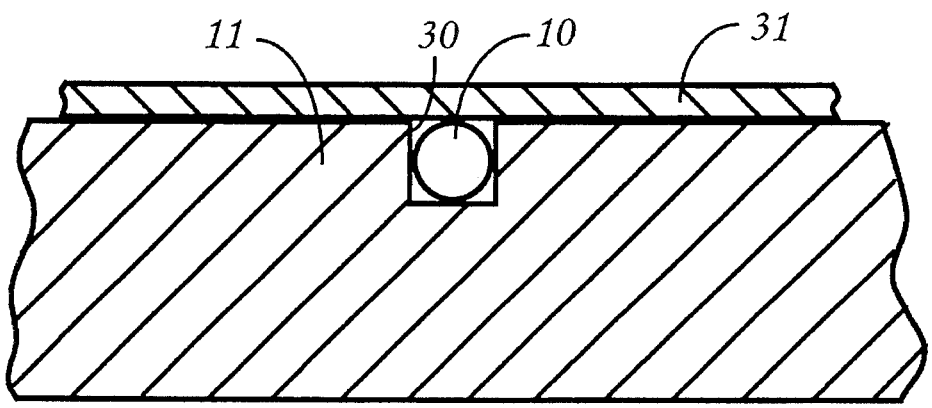
Figure 4:
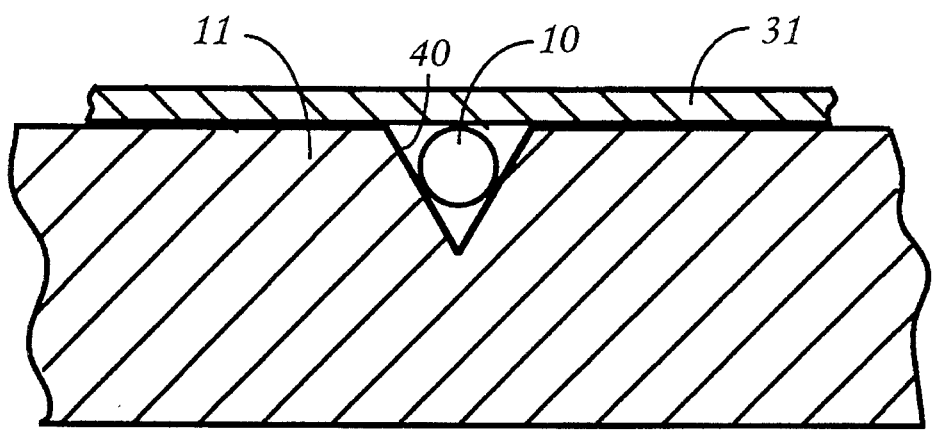

An alternative form of securing the fibre 10 in a groove in the plate 11 is to employ a square cross-section groove 30, as depicted in FIG. 3, and to clamp the fibre in this groove with a cover plate 31. A potential drawback of this approach is the risk of introducing unwanted birefringence into the fibre through non-symmetric stresses imposed upon it by the clamping operation. It may therefore be preferred to use an arrangement as depicted in FIG. 4 where the groove 40 is of equilateral triangular cross-section.

If the fibre 10 is housed in a groove in the plate 11, the depth of that groove must be limited so that the fibre axis lies in a surface displaced from the neutral surface of bending of the plate when the plate is bent into a curve. (Such a displacement of course automatically obtains if the fibre is not housed in a groove). The requirement for this displacement is so that bending of the plate can be arranged to produce compressive or tensile strain in the fibre in its axial direction according to whether the fibre lies on the concave or the convex side of the plate. The fibre 10 is provided with a distributed Bragg grating of uniform pitch before it is secured in an unstrained state to the plate 11. Conveniently plate 11 is planar when in an unstressed condition, and curvature may be induced in the plate by clamping one edge and then applying shear force to the opposite edge. Such shear force may for instance be applied through the agency of a knife-edge (not shown). If, in its unstressed state, the plate extends in the xy plane, as depicted by broken lines in FIG. 1, before being clamped along an edge aligned with the x-axis, and then the opposite edge of the plate is uniformly raised to provide the configuration as depicted by the solid lines of FIG. 1, the result of this uniform raising of the opposite edge has been to introduce curvature of the plate in the yz plane where none was present before. On the other hand, in the orthogonal xz plane, no curvature has been introduced. The arcuate path of the fibre 10 on the plate 11 is such that, near end 'a', it is extending in a direction aligned with or at a small angle to the y axis, whereas at the opposite end 'b' it is extending in a direction aligned with or at a small angle to the x axis. The absence of curvature of the plate 11 in the xz plane means that this bending of it has introduced substantially no strain in the fibre near end 'b' where it is extending in a direction aligned substantially with the x axis. On the other hand, near end 'a'. where the fibre is extending in a direction aligned substantially with the y axis, the bending of the plate has introduced maximum strain in the fibre. The amount of strain between the two ends 'a' and 'b' is graded in a manner functionally dependent upon the shape of the arcuate path of the fibre 10 and the shape of the curve in the plate 11. In this particular instance the fibre 10 is located on the concave site of the curved plate 11, and so the fibre is compressivly strained in its axial direction. Tensile, instead of compressive, strain can be obtained by reversing the curvature of the plate about the x-axis so that the fibre lies on or in its convex surface instead of its concave one. Alternatively the unstrained fibre can be secured to the concave surface of a curved plate 11, whose curvature is then reduced, either towards, or right up to planarity, or even to reverse curvature.

I claim:

1. A chirped distributed Bragg grating optical fibre filter having an optical fibre provided with a Bragg distributed grating therein, which grating has a uniform pitch when the fibre is unstrained, and which fibre is secured in an arcuate path to a flexible plate to a single major surface of said plate so as to be displaced from the neutral surface of bending of that plate, which path on said single major surface of the plate is arcuate when the plate is caused to be planar.

2. A method of making a chirped distributed Bragg grating optical fibre filter wherein a uniform pitch distributed Bragg grating is generated in a length of optical fibre that at the time of generation is unstrained or uniformly strained in its axial direction, wherein the fibre is then secured to a flexible plate, to a single major surface of said plate, in an arcuate path that is displaced from the neutral surface of bending of the plate, which path on said single major surface of the plate is arcuate when the plate is caused to be planar, and wherein the curvature of the plate is subsequently changed so as to impart axial strain to the fibre that is non-uniform along the length of the grating generated therein.

\* \* \* \* \*